US012585561B2

(12) United States Patent
Maliszewski et al.

(10) Patent No.: US 12,585,561 B2
(45) Date of Patent: Mar. 24, 2026

(54) TECHNIQUE FOR GENERATING TESTS FOR A PROCESSING DEVICE

(71) Applicant: Arm Limited, Cambridge (GB)

(72) Inventors: Edward Austin Maliszewski, Austin, TX (US); Brandon Grant Tulang Cuevas, Austin, TX (US); Timothy Ryan Joslin, Austin, TX (US); Michael William Verlinden, Austin, TX (US); Tara Alyse Baker, Austin, TX (US)

(73) Assignee: Arm Limited, Cambridge (GB)

( * ) Notice: Subject to any disclaimer, the term of this patent is extended or adjusted under 35 U.S.C. 154(b) by 52 days.

(21) Appl. No.: 18/596,049

(22) Filed: Mar. 5, 2024

(65) Prior Publication Data

US 2025/0284604 A1      Sep. 11, 2025

(51) Int. Cl.
*G06F 11/00* (2006.01)
*G06F 11/22* (2006.01)
(Continued)

(52) U.S. Cl.
CPC ........ *G06F 11/261* (2013.01); *G06F 11/2236* (2013.01); *G06F 11/263* (2013.01)

(58) Field of Classification Search
CPC ... G06F 11/261; G06F 11/2236; G06F 11/263
See application file for complete search history.

(56) References Cited

U.S. PATENT DOCUMENTS 8,589,892 B2    11/2013  Fournier et al.
10,255,172 B1 *    4/2019  Kucherov  ........... G06F 11/3688
(Continued)

OTHER PUBLICATIONS

Search Report for GB Application No. 2500086.0 dated Jun. 20, 2025, 4 pages.

*Primary Examiner* — Joseph D Manoskey
(74) *Attorney, Agent, or Firm* — NIXON & VANDERHYE P.C.

(57) ABSTRACT

A computer-implemented system and method is described for generating a supplemented test to be performed for a processing device under test. The method comprises receiving result information from performing an initial test on a representation of the processing device under test, the initial test providing a program to be executed and associated data, and determining from the result information a sequence of instructions that would be executed by the processing device under test when adopting in order execution of the program. A plurality of stress injection elements are provided, each having an associated hazard condition. One or more iterations of a test modification process are performed, comprising: identifying, from the sequence of instructions, a given control flow influencing event that causes a selection between a first path that will be chosen when adopting the in order execution of the program, and a second path; identifying one or more instructions in an instruction window associated with the given control flow influencing event, and one or more associated resources; selecting, in dependence on the one or more instructions and the one or more associated resources, a stress injection element from the plurality of stress injection elements; and employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed. A supplemented test is then generated using a modified program generated through performance of the one or more iterations of the test modification process.

20 Claims, 7 Drawing Sheets

(51) Int. Cl.
    *G06F 11/26*        (2006.01)
    *G06F 11/263*      (2006.01)

(56)                 References Cited

U.S. PATENT DOCUMENTS

| | | |
|---|---|---|
| 11,106,602 B2 | 8/2021 | Hendrickson et al. |
| 11,567,855 B1 * | 1/2023 | Fletcher ................ G06F 11/263 |
| 11,847,035 B2 | 12/2023 | Meissner et al. |
| 2013/0191689 A1 * | 7/2013 | Almog ................ G06F 11/2236 |
| | | 714/E11.178 |
| 2015/0186250 A1 * | 7/2015 | Friedler ................ G06F 11/261 |
| | | 717/124 |
| 2023/0065911 A1 * | 3/2023 | Kemp ................... G06F 11/263 |
| 2024/0118991 A1 * | 4/2024 | Zakharchenko .... G06F 11/3698 |

* cited by examiner

ADDR   0x0004    $INST^N$ A

ADDR   0x0008    $INST^N$ B

ADDR   0x000C    $INST^N$ C (BRANCH)

TAKEN PATH
(PATH 1)    160    NOT TAKEN PATH
    (PATH 2)  (MAY BE FOLLOWED DURING
    SPECULATIVE EXECUTION)

150

ADDR 0x0010 $INST^N$ P    TEST
ADDR 0x0014 $INST^N$ Q    MODIFICATION
ADDR 0x0018 $INST^N$ R    PROCESS

ADDR   0x0060    $INST^N$ D    INJECT
    INSTRUCTIONS
ADDR   0x0064    $INST^N$ E    P, Q, R
    AIMED AT
    INTRODUCING
    ONE OR MORE
    HAZARD CONDITIONS

IMAGE OF PHYSICAL MEMORY
PRIOR TO TEST MODIFICATION PROCESS
INJECTED INSTRUCTIONS P, Q, R CAN BE
ADDED HERE
215
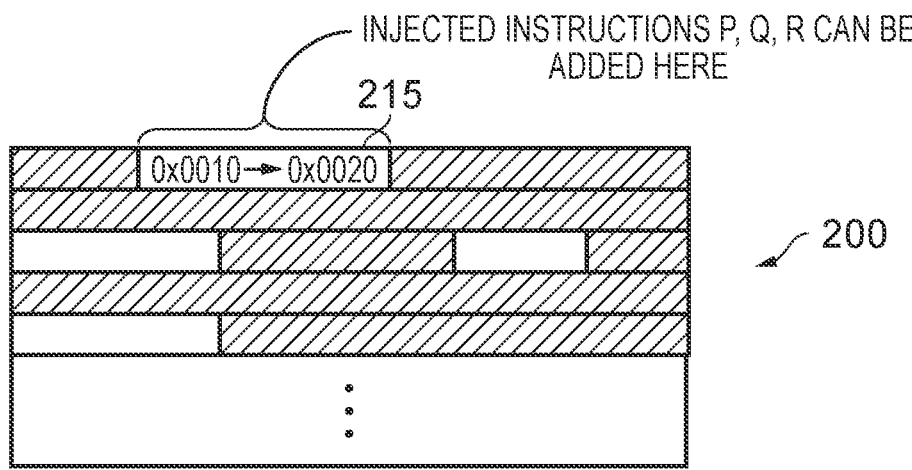
0x0010 → 0x0020
200
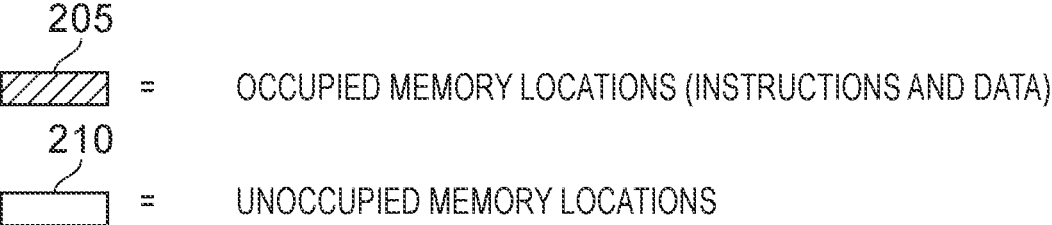
205
☒ = OCCUPIED MEMORY LOCATIONS (INSTRUCTIONS AND DATA)
210
☐ = UNOCCUPIED MEMORY LOCATIONS
FIG. 4

SELECTION OF
STRESS INJECTION
ELEMENT

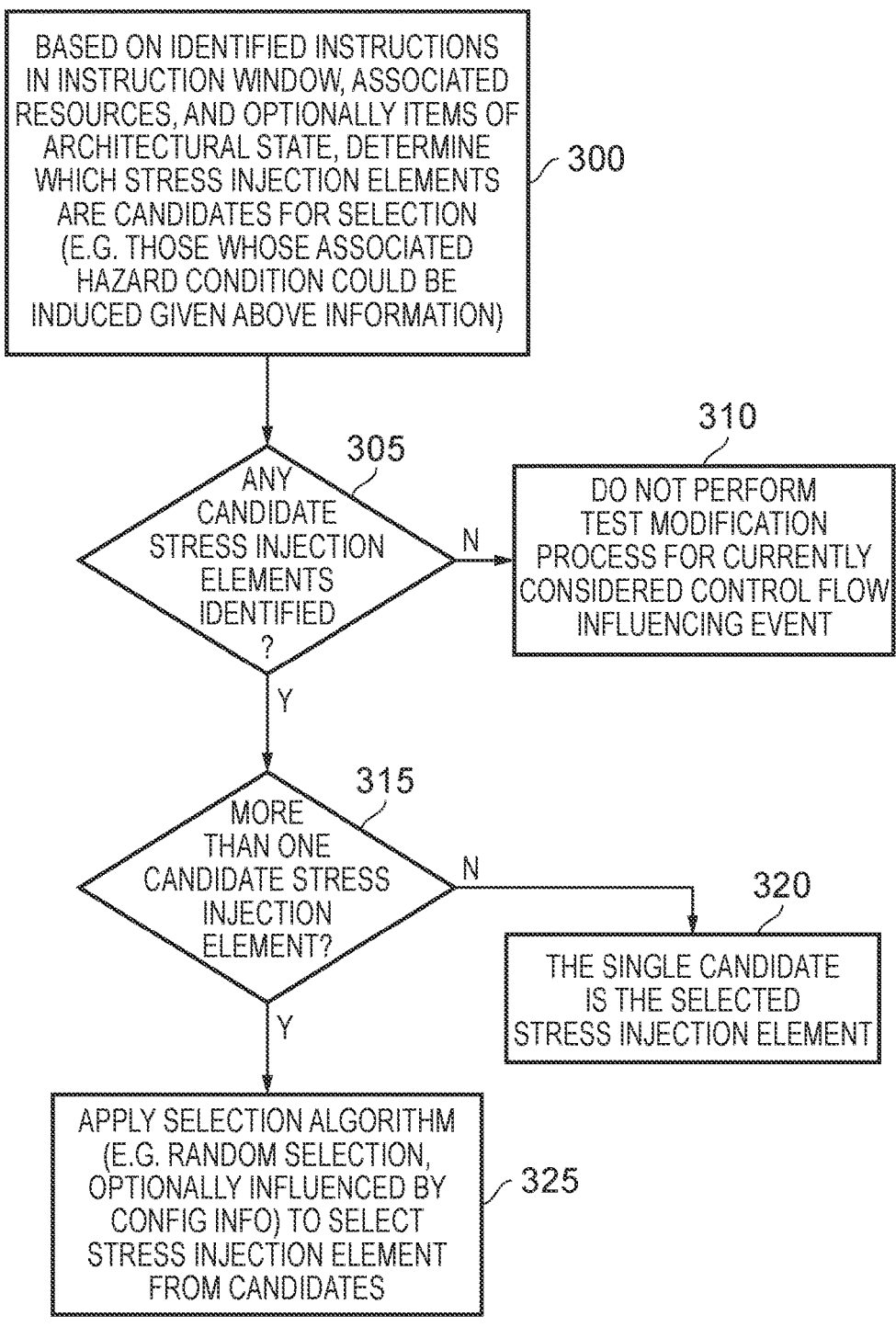

BASED ON IDENTIFIED INSTRUCTIONS
IN INSTRUCTION WINDOW, ASSOCIATED
RESOURCES, AND OPTIONALLY ITEMS OF
ARCHITECTURAL STATE, DETERMINE
WHICH STRESS INJECTION ELEMENTS
ARE CANDIDATES FOR SELECTION
(E.G. THOSE WHOSE ASSOCIATED
HAZARD CONDITION COULD BE
INDUCED GIVEN ABOVE INFORMATION) — 300

305
ANY
CANDIDATE
STRESS INJECTION
ELEMENTS
IDENTIFIED
?

N →

310
DO NOT PERFORM
TEST MODIFICATION
PROCESS FOR CURRENTLY
CONSIDERED CONTROL FLOW
INFLUENCING EVENT

Y

315
MORE
THAN ONE
CANDIDATE STRESS
INJECTION
ELEMENT?

N →

320
THE SINGLE CANDIDATE
IS THE SELECTED
STRESS INJECTION ELEMENT

Y

APPLY SELECTION ALGORITHM
(E.G. RANDOM SELECTION,
OPTIONALLY INFLUENCED BY
CONFIG INFO) TO SELECT
STRESS INJECTION ELEMENT
FROM CANDIDATES — 325

FIG. 6

TECHNIQUE FOR GENERATING TESTS
FOR A PROCESSING DEVICE

BACKGROUND

The present technique relates to the generation of tests to be performed when designing a processing device.

When designing a processing device, it is typically desired to perform a variety of tests to seek to check that that processing device will operate as intended. Often, the tests are performed on one or more models of the processing device being developed, with the aim of identifying bugs and implementing corrective action to address such bugs, before committing the design of the processing device to production.

Much of the testing is aimed at verifying architectural functions and features of the processing device under development. For a given program and associated data to be used when executing that program, the processing device may operate in a particular way when the instructions of that program are executed in order. It is often the case that during the execution of the program many control flow influencing events will arise that cause a selection between different paths through the program. For example, a branch instruction may be encountered causing a selection between two paths. When considering the in order execution of the program, one of those paths will be the architecturally correct path to take, based on the data used by the program during execution.

However, modern processing devices typically provide micro-architectural features to allow speculative execution of instructions to seek to increase performance. Such speculative execution can enable instructions to be executed out of order, and may cause a path other than the architecturally correct path to be followed until such time that a miss-speculation is detected. For example, branch prediction circuitry may predict the path to be taken following a given branch instruction, but when that given branch instruction subsequently reaches the execute stage of the processing pipeline it may be determined that the prediction was incorrect. As a result of such a prediction, a number of instructions in the incorrect path may have been speculatively executed, and when the miss-speculation is determined, the processing device needs to be able to rewind execution to the appropriate point, correct its internal state to remove any effects due to the instructions that were speculatively executed in the incorrect path, and then resume execution following the architecturally correct path. It is important that the features added to the processing device design to support speculative execution do not affect architectural state (i.e. the final execution result should be the same irrespective of whether speculative execution caused one or more instructions to be executed that shouldn't have been executed), but it is typically difficult when performing testing to thoroughly test that the micro-architectural features provided to support speculative execution do not affect architectural compliance of the design.

SUMMARY

In accordance with a first example arrangement, there is provided a computer-implemented method of generating a supplemented test to be performed for a processing device under test, comprising: receiving result information generated as a result of performing an initial test on at least one representation of the processing device under test, the initial test providing a program to be executed and associated data to be used when performing the initial test; determining from the result information a sequence of instructions that would be executed by the processing device under test when adopting in order execution of the program; providing a plurality of stress injection elements, each stress injection element having an associated hazard condition; employing test modification circuitry to perform one or more iterations of a test modification process comprising: identifying, from the sequence of instructions, a given control flow influencing event that causes a selection between a first path that will be chosen when adopting the in order execution of the program using the associated data provided by the initial test, and a second path; identifying from the result information one or more instructions in an instruction window associated with the given control flow influencing event, and one or more associated resources that the one or more instructions will interact with when executed; employing selection circuitry to select, in dependence on the one or more instructions and the one or more associated resources, a stress injection element from the plurality of stress injection elements; employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed; and generating the supplemented test using a modified program generated as a result of performing the one or more iterations of the test modification process.

In accordance with another example arrangement, there is provided a system comprising: an input interface to receive result information generated as a result of performing an initial test on at least one representation of a processing device under test, the initial test providing a program to be executed and associated data to be used when performing the initial test; sequence identifying circuitry to determine from the result information a sequence of instructions that would be executed by the processing device under test when adopting in order execution of the program; a plurality of stress injection elements, each stress injection element having an associated hazard condition; test modification circuitry to perform one or more iterations of a test modification process comprising: identifying, from the sequence of instructions, a given control flow influencing event that causes a selection between a first path that will be chosen when adopting the in order execution of the program using the associated data provided by the initial test, and a second path; identifying from the result information one or more instructions in an instruction window associated with the given control flow influencing event, and one or more associated resources that the one or more instructions will interact with when executed; employing selection circuitry to select, in dependence on the one or more instructions and the one or more associated resources, a stress injection element from the plurality of stress injection elements; and employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed; and generation circuitry to generate a supplemented test using a modified program generated as a result of performing the one or more iterations of the test modification process.

In accordance with a further example arrangement, there is provided a computer program comprising program instructions which, when executed on a computer, are arranged to cause the computer to implement the method of the first example arrangement. The computer program may be provided in any known transitory computer-readable medium (such as wired or wireless transmission of code over a network) or non-transitory computer-readable medium such as semiconductor, magnetic disk, or optical disc.

BRIEF DESCRIPTION OF THE DRAWINGS

Further aspects, features and advantages of the present technique will be apparent from the following description of examples, which is to be read in conjunction with the accompanying drawings, in which:

FIG. 4 schematically illustrates how the injected instructions generated by the test modification process may be added to unoccupied memory locations within the image of physical memory, in accordance with one example implementation;

FIG. 6 is a flow diagram illustrating how a stress injection element may be selected in accordance with one example implementation.

DESCRIPTION OF EXAMPLES

Figure 1:
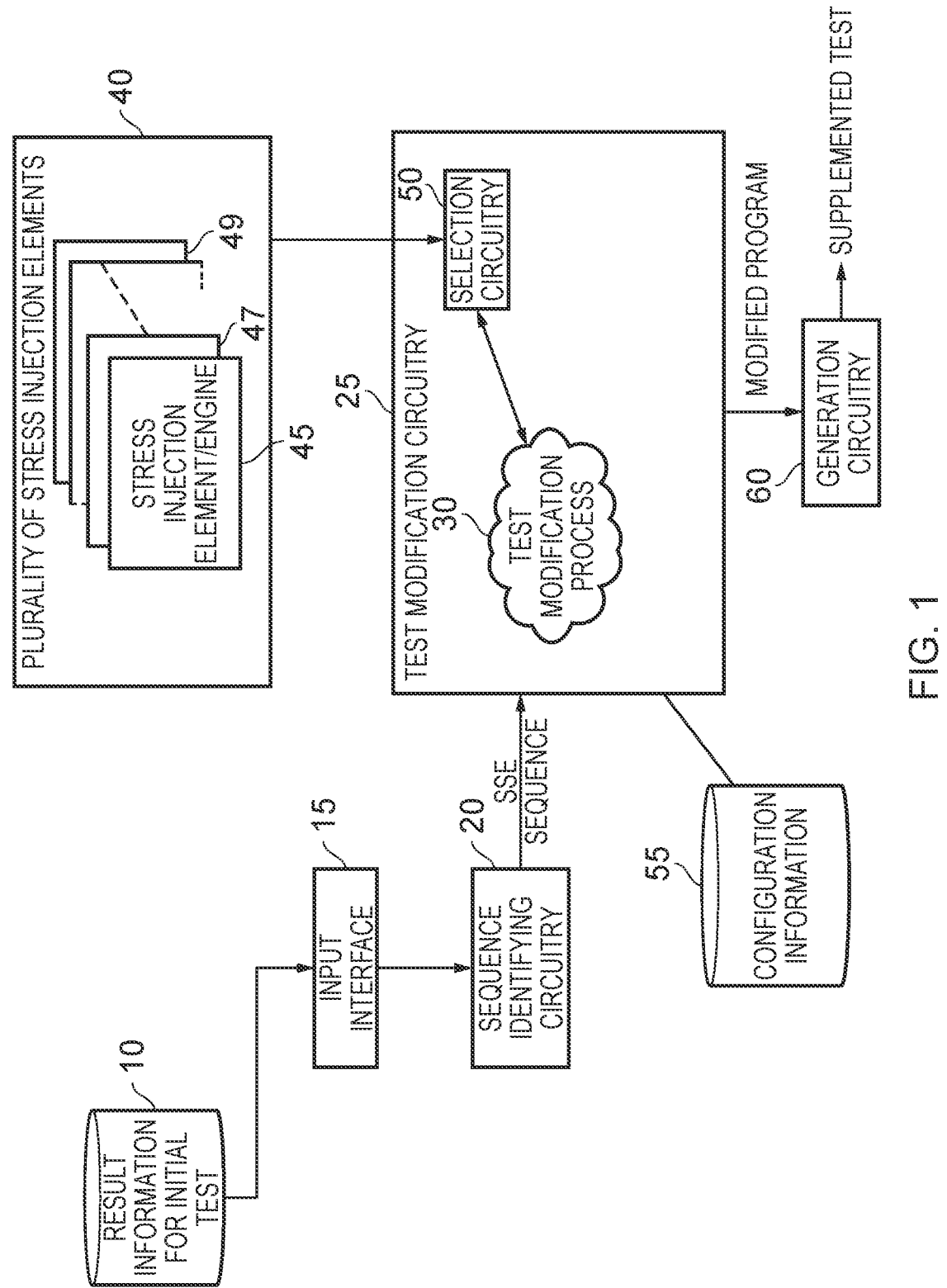
FIG. 1 is a block diagram of a system in accordance with one example arrangement.

In accordance with one example implementation, a computer-implemented method of generating a supplemented test to be performed for a processing device under test is provided. The method comprises receiving result information generated as a result of performing an initial test on at least one representation of the processing device under test, the initial test providing a program to be executed and associated data to be used when performing the initial test. The at least one representation of the processing device under test that the initial test is performed on can take a variety of forms. Whilst in principle the initial test could be performed on the actual processing device itself, it is often the case that the test is performed on one or more models of the processing device rather than on the actual device itself, as it is much more cost-effective to seek to identify bugs in a design of the processing device before the processing device is committed to manufacture.

The models can take a variety of forms. For example, the model may provide a simulation of the logic that will be implemented in the actual hardware of the device. For instance, this logic may be described in a Hardware Description Language (HDL) such as Verilog or VHDL. This HDL description can be simulated in an HDL simulator. It is common for tests to be run on such a simulation of the device as this facilitates finding bugs in the device's logic. As part of the device creation process, the HDL will be processed by an HDL synthesis tool which transforms the higher level logic expressed in the HDL description into a list of gates and wire connections between them that implement the logic described. This configuration of gates can also be simulated and if desired one or more tests could be run on that simulation.

As another example of a representation of the processing device under test that could be used during testing, a higher level representation of the architecture implemented by the device may be used (often called a functional model). This is generally implemented in a general purpose programming language like C++ and does not try to capture any details about how the physical device works. This representation is typically not cycle accurate and instead is employed to model in order execution (also referred to as simple sequential execution (SSE) or non-speculative execution) behaviour. In one example implementation, such a functional model could be used to produce some of the result information relating to the initial test, for example execution trace information, whilst one of the earlier described simulator models could be used to perform the initial test in order to generate other portions of the result information.

Once provided with the result information generated as a result of performing the initial test on at least one representation of the processing device under test, then the computer-implemented method described herein further involves determining from the result information the sequence of instructions that would be executed by the processing device under test when adopting in order execution of the program. Given that the initial test has actually been performed, and the result information generated as a result of the performance of that test, this sequence of instructions can readily be determined from information present in the result information, for example with reference to execution trace information that will typically be incorporated within the result information.

In accordance with the technique described herein, a plurality of stress injection elements are provided, each stress injection element having an associated hazard condition. The stress injection elements can take a variety of forms, but in one example implementation take the form of software functions, each of which are used to generate instructions to inject into a not taken path of the program. As mentioned earlier, when adopting in order execution of the program, then based on the data used by the program when executing there will be an architecturally correct path to be taken by the program for any given control flow influencing event (which may also be referred to herein as the taken path or the first path), and also an incorrect path that should not be taken (which may also be referred to herein as the not taken path or the second path) but which may be followed during speculative execution of the program by the processing device under test. Each stress injection element has an associated hazard condition, and as will be discussed in more detail below can be used to inject instructions into the not taken path in order to seek to induce that hazard condition. The hazard conditions can take a wide variety of forms, but may for example seek to induce hazards by interacting with privilege, dependency, control logic, etc.

More particularly, the method described herein is arranged to employ test modification circuitry to perform one or more iterations of a test modification process. That test modification process comprises identifying, from the SSE sequence of instructions, a given control flow influencing event that causes a selection between a first (architecturally correct) path that will be chosen when adopting the in order execution of the program using the associated data provided by the initial test, and a second path. Further, the test modification process is arranged to identify from the result information one or more instructions in an instruction window associated with the given control flow influencing event, and one or more associated resources that the one or more instructions will interact with when executed. The instruction window will typically include one or more instructions prior to encountering the given control flow influencing event, and one or more subsequent instructions in the first path following the given control flow influencing event, and in one example implementation the size of the instruction window may be configurable. The above-mentioned one or more associated resources that the instructions in the instruction window interact with can take a variety of forms, and may for example include storage structures such as registers, caches, translation lookaside buffers (TLBs), memory locations, etc. In addition, or alternatively, the associated resources may include prediction structures (for example branch predictors) and/or out of order execution bookkeeping structures (such as register rename tables, reorder buffer entries, reservation stations, etc.).

The test modification process further involves employing selection circuitry to select, in dependence on the one or more instructions and the one or more associated resources, a stress injection element from the plurality of stress injection elements, and then employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed. Once the test modification process has been performed in one or more iterations, then the method further comprises generating the earlier-mentioned supplemented test using a modified program generated as a result of performing the one or more iterations of the test modification process.

By using the above described technique to inject instructions into the second path aimed at inducing one or more hazard conditions, this enables the generation of a modified program that, when executed, can stress architectural compliance of the design by stressing the micro-architectural logic used to support speculative execution. In particular, the use of speculative execution, as controlled by such micro-architectural logic, should not affect architectural state, but it is possible that the micro-architectural functions used to support such speculative execution could affect architectural state if there is a bug in the design. By injecting into one or more paths that could be followed during speculative execution, instructions that are specifically aimed at inducing a hazard condition that could cause incorrect operation in the presence of a bug, this approach can be used to provide a targeted mechanism for seeking to identify bugs that may arise due to speculative execution.

The initial test used in the above process can take a variety of forms, but in one example implementation is a test that resulted in architecturally compliant operation when that test was performed on the at least one representation of the processing device under test. By starting with an architecturally compliant test this makes detection of potential bugs occurring as a result of speculative execution to be more readily determined, by for example determining whether running of the supplemented test gives a different result to the running of the initial test. If a different result is obtained when running the supplemented test, this implies that speculative execution of one or more of the instructions injected through the use of the earlier-mentioned stress injection elements has triggered an error (as mentioned earlier, the use of speculative execution should not affect correct operation, since in a correctly designed system it should be possible to recover from any miss-speculation and hence produce an end result that would be the same as that produced had speculative execution not been used).

In one particular example implementation, the method further comprises receiving further result information generated as a result of performing the supplemented test on at least one representation of the processing device under test (which may or may not be the same one or more representations of the processing device under test used when performing the initial test), and then employing comparison circuitry to determine whether there is any disparity between the result information (i.e. that obtained as a result of performing the initial test) and the further result information (i.e. that obtained as a result of performing the supplemented test). The result information obtained as a result of running the tests may include a variety of pieces of information, but in one example implementation will include a full trace of the instructions executed by the test and the architectural effects of each of those instructions (including for example the registers read or written, the memory locations read or written, etc.). By comparing the result information obtained from the initial test with the further result information obtained from the supplemented test, it is hence possible to detect disparities between the results, thereby allowing for the detection of bugs introduced as a result of the additional instructions added by the stress injection elements. The more details that are included within the result information and the further result information, then the more sophisticated the comparison can be.

Whilst in one example only one iteration of the test modification process could be performed in order to generate the modified program, in one example implementation multiple iterations of the test modification process are performed. For at least one iteration of the multiple iterations, a control flow influencing event identified as the given control flow influencing event is different to the control flow influencing event identified as the given control flow influencing event for at least one other iteration of the multiple iterations. Hence, multiple control flow influencing events can be considered, with stress injection elements being selected for each of those control flow influencing events, and resultant instructions being injected into the second paths of those control flow influencing events, in order to generate the modified program for use when performing the supplemented test.

In addition, or alternatively, for two or more iterations of the multiple iterations the same control flow influencing event may be identified as the given control flow influencing event for those two or more iterations. Such an approach would allow, for example, for more than one stress injection element to be selected for the same control flow influencing event, with each selected stress injection element being used to inject one or more instructions into the second path that, when executed, will provide a stimulus aimed at inducing the hazard condition associated with that selected stress injection element.

There are a number of ways in which the selection circuitry can be used to determine a suitable stress injection element to be used for any given control flow influencing event. In one example implementation, the selection circuitry is arranged to determine at least one candidate stress injection element from the plurality of stress injection elements, and in the presence of more than one candidate stress injection element, to apply a selection algorithm to choose the selected stress injection element from the candidate stress injection elements.

There are various ways in which each candidate stress injection element can be determined. In one example implementation, the selection circuitry is arranged to determine the at least one candidate stress injection element taking into account the one or more instructions in the instruction window, the one or more associated resources that the one or more instructions interact with when executed, and the associated hazard condition of each stress injection element in the plurality of stress injection elements. For example, it may be determined that for a particular stress injection element, the associated hazard condition cannot be, or is very unlikely to be, induced given the instructions in the instruction window and the resources that those instructions interacted with. Purely by way of illustrative example, if none of the instructions in the instruction window perform accesses to memory, and the hazard condition associated with a particular stress injection element involves seeking to manipulate accesses to memory, then it may not be appropriate to select that particular stress injection element for the control flow influencing event under consideration.

In one particular example implementation, the selection algorithm may be arranged to reference configuration information used to apply relative weights to one or more of the stress injection elements that influence how the selected stress injection element is chosen. By such an approach, it is possible to apply biasing amongst the stress injection elements so as to increase the frequency with which certain stress injection elements are chosen by the selection circuitry. In one example implementation, the relative weights specified by the configuration information can be used to provide a default bias for each stress injection element. Based on the analysis mentioned earlier, whereby it may be determined for a particular control flow influencing event under consideration that one or more of the stress injection elements should not be used, then the default bias for those one or more stress injection elements could be forced to zero for the current selection process so as to exclude those stress injection elements from consideration.

In one example implementation, the selection algorithm is arranged to apply a pseudo random selection step when choosing the selected stress injection element from the candidate stress injection elements. In one example implementation, such a pseudo random selection process can incorporate the above-mentioned relative weights/biasing, whereby the stress injection element is selected pseudo-randomly according to the biases such that the probability of selection is dependent on the biases. In an alternative implementation where no relative weights/biasing is used, then the process may instead exclude any stress injection elements that are not suitable having regard to the current control flow influencing event under consideration, and then pseudo-randomly select one of the remaining stress injection elements (effectively giving the remaining stress injection elements equal weight).

By adjusting the seed to a pseudorandom number generator used during the pseudo random selection step, it is possible to produce a number of different supplemented tests derived from the same initial test, hence enabling multiple further tests to be efficiently generated to seek to stress test architectural compliance in the presence of speculative execution.

There are a number of ways in which the SSE sequence of instructions that would be executed by the processing device under test when adopting in order execution of the program may be determined, but in one example implementation that sequence of instructions is determined with reference to analysis of at least execution trace data for the program as provided by the result information. The execution trace data can take a variety of forms, but in one example implementation provides a list of the instructions executed, and for each executed instruction an indication of what happened when that instruction was executed, for example the registers read from or written to.

In one example implementation, the test modification process further comprises determining architectural state associated with the instruction window (in addition to determining the one or more instructions in that instruction window and one or more associated resources that those instructions interacted with when executed), and arranging the selection circuitry to reference the architectural state when selecting the stress injection element. The items of architectural state referred to can take a variety of forms, but could for example be an indication of the exception level at which the processing device is operating, the address translation regime being used, certain system register contents, etc. It can be useful to take such items of architectural state into consideration when determining a suitable stress injection element. By way of specific example, use of a stress injection element that is seeking to stress test TLB usage may not be useful if the architectural state indicates that the memory management unit (MMU) is disabled. As another example, certain instructions are only defined in certain execution modes, and hence it is useful to know the current execution mode when interpreting how the instructions in the instruction window have been used.

In one example implementation, the result information comprises an image of physical memory identifying memory locations occupied by instructions forming the program to be executed and memory locations occupied by the associated data, and the selected stress injection element is arranged to insert the one or more additional instructions in unoccupied memory locations within the image of physical memory when modifying the program to include those one or more additional instructions. This provides a simple and effective mechanism for storing the additional instructions introduced by the test modification circuitry during production of the modified program. Whilst in one example implementation the unoccupied memory locations may be memory locations in which no code or associated data is stored in the initial physical memory image, in another example implementation a memory location in the initial physical memory image could also be considered to be unoccupied if it contains a value that can be determined from the result information to have been unused by the SSE execution of the test. By such an approach this could allow the algorithm applied by the selected stress injection element to replace branch shadow content that already exists in a test (such as having been hand coded or placed there by another random test generation process) with new content.

In one example implementation, in addition to employing the selected stress injection element to add one or more additional instructions, the selected stress injection element can also be used to add one or more items of additional data to the associated data, for use when executing the one or more additional instructions. As with the above approach for accommodating the additional instructions, the image of physical memory can be used to identify unoccupied memory locations, and the additional data can be stored within those unoccupied memory locations.

The control flow influencing events considered when performing the above-described test modification process can take a variety of forms. For example, the occurrence of an exception may cause a change in instruction flow and hence be considered as a control flow influencing event. In one example implementation, at least one type of control flow influencing event considered is execution of a control flow influencing instruction (for example a branch instruction) within the sequence of instructions.

In one example implementation, when multiple iterations of the test modification process cause multiple stress injection elements to be selected for a same given control flow influencing event, each of the multiple stress injection elements causing one or more additional instructions to be added to the second path, the method further comprises generation of metadata identifying any interaction between the additional instructions added to the second path by different stress injection elements. For instance, it is possible that the instructions added by one stress injection element may interact with instructions added by another stress injection element to the same second path, for example by introducing one or more dependencies, and it can hence be useful to capture metadata identifying such interactions. This metadata can be used for example to capture information about instruction injections, resource usage, and modifications that might be appropriate to adapt the modified test to the processing device under test.

In one example implementation, it may be possible for the one or more instructions added by a selected stress injection element to include a control flow influencing instruction. In such a scenario, it may be useful to apply the above described process in connection with that injected control flow influencing instruction. Hence, in one example implementation, when the one or more additional instructions added by a given iteration of the test modification process include an added control flow influencing instruction, the method comprises enabling a further iteration of the test modification process to identify the added control flow influencing instruction as the given control flow influencing event for that further iteration. Such an approach hence allows recursion of the process to occur by allowing further test scenarios to be generated in the shadows of branches that themselves were injected by the use of one or more stress injection elements. If desired, such functionality can be constrained, for example by restricting a stress injection element to only inject certain types of control flow influencing instructions, for example to only inject direct branches. As another example, such injected branches may be constrained to target existing memory locations, hence causing re-convergence.

Particular example implementations will now be described with reference to the figures.

FIG. 1 is a block diagram of a system in accordance with one example arrangement. Result information 10 obtained as a result of performing an initial test on at least one representation of the processing device under test is provided to input interface 15. As discussed earlier, the at least one representation of the processing device under test can take a variety of forms. Whilst one representation could be the actual processing device itself, it is often the case that the test is performed on one or more models of the processing device rather than on the actual device itself, for example a model that provides a simulation of the logic that will be implemented in the actual hardware of the device, and/or a functional model providing a higher level representation of the architecture implemented by the device.

The result information is forwarded from the input interface 15 to sequence identifying circuitry 20 that is arranged to determine from the result information a sequence of instructions that would be executed by the processing device under test when adopting in order execution of the program provided for the initial test (also referred to herein as simple sequential execution (SSE)). This may for example be determined with reference to execution trace information that will typically be incorporated within the result information 10. The SSE sequence of instructions is then provided to test modification circuitry 25 that is arranged to perform one or more iterations of a test modification process 30. Each time the test modification process is performed, it is arranged to identify a control flow influencing event within the SSE sequence that causes the selection between a first (architecturally correct) path that will be chosen when adopting in order execution of the program using the associated data provided by the initial test, and a second path. The control flow influencing event may take a variety of forms, for example occurrence of an exception, or execution of a control flow influencing instruction such as a branch instruction. Considering the example of a conditional branch instruction, it will be appreciated that, based on the data used by the program at the time the branch instruction is executed, that branch may either be taken, with the instruction flow hence branching to a determined target address, or the branch will not be taken, causing the next sequential instruction after the branch instruction to be executed. When adopting SSE execution, only one of those options will be the correct option to take based on the data, and the resultant path taken is referred to herein as the first (architecturally correct) path. The path that was not the correct option is referred to herein as the second path, and may also be referred to as the not taken path. It should be noted that the term "not taken path" should not be confused with references to a branch not being taken, since as noted above, in some instances the branch not being taken may represent the architecturally correct (first) path.

Once a control flow influencing event has been selected, the test modification process is arranged to identify from the result information one or more instructions in an instruction window associated with that selected control flow influencing event, and one or more associated resources that the one or more instructions will interact with when executed. The associated resources that the instructions in the instruction window interact with can take a variety of forms, for example storage structures, prediction structures, out of order execution bookkeeping structures, etc. In one example implementation, the test modification process may also at this stage determine architectural state associated with the instruction window, for example an indication of the exception level at which the processing device is operating, the address translation regime being used, certain system register contents, etc.

As discussed earlier, the instruction window will typically include one or more instructions prior to encountering the selected control flow influencing event, and one or more subsequent instructions in the first path following the given control flow influencing event. The size of the instruction window may in one example implementation be fixed, but in another example implementation could be arranged to be configurable, specified for example by configuration information 55 accessible to the test modification circuitry 25.

As shown in FIG. 1, the system provides a plurality of stress injection elements 45, 47, 49, collectively referred to by the reference numeral 40 in FIG. 1, each stress injection element having an associated hazard condition. The stress injection elements can take a variety of forms, but in one example implementation take the form of software functions, each of which are used to generate instructions to inject into a not taken (second) path of the program.

Once the test modification process has identified the instructions in the instruction window, the associated resources, and optionally one or more items of architectural state, selection circuitry 50 is then used to select, in dependence on that information, one of the stress injection elements 40 for use in generating one or more additional instructions to inject into the second path. In particular, once selected, the selected stress injection element is arranged to modify the program specified by the initial test by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed.

The hazard conditions associated with the various stress injection elements can take a variety of forms. For example, one stress injection element may be arranged to stress register dependencies. Purely by way of specific example, it may be noted from the above analysis of information obtained from the instruction window that a given instruction in the first path following the control flow influencing event reads from the register R1. A stress injection element that is designed to stress register dependencies may be arranged to inject into the second path an instruction that writes a particular value into the register R1. As discussed earlier, speculative execution of instructions in the second path should not affect architectural state (i.e. the final execution result should be the same irrespective of whether speculative execution caused one or more instructions to be executed that shouldn't have been executed), and hence when miss-speculation is determined and instruction execution rewound so as to then correctly follow the first path from the control flow influencing event, execution of the above-mentioned given instruction in the first path should not result in reading from register R1 the particular value that the injected instruction in the second path had written. If it does, then this indicates the presence of a bug.

As another example of a stress injection element, a stress injection element may be designed to stress memory dependencies, and operate in a similar way to that discussed above in respect of register dependencies. Another stress injection element may be arranged to seek to induce MMU faults, for example by trying to cause an exception which should not arise when speculatively executing instructions in the second path. As another example, a stress injection element may introduce instructions into the second path that seek to modify one or more descriptors used to define virtual to physical address translation, with the aim of seeking to compromise the correct address translation used when executing instructions within the first path. As a yet further example, a stress injection element may seek to introduce instructions into the second path that result in long latency, for example initiating long loads or stores. Such an approach can be used to emulate a denial of service type of attack, and may for example because the processing device to run out of slots for loads or stores which could potentially prevent a correct return to the non-speculative first path in due course when miss speculation is determined to have occurred. As a still further example, a stress injection element may introduce instructions into the second path that try to overwrite instructions in the architecturally correct first path.

In one example implementation, the stress injection element chosen by the selection circuitry 50 is selected at random. Alternatively, a hybrid approach may be taken where the configuration information 55 is used to provide weight/biasing information for the various stress injection elements, with that weight/biasing information being programmable by a user, and that weight/biasing information is then used to bias the random selection made by the selection circuitry, so that the frequency with which various stress injection elements are selected is dependent on the associated weight/biasing information.

Further, it will be appreciated that, for any given control flow influencing event under consideration, one or more of the possible stress injection elements may not be appropriate to select. For example, if it is determined that the instructions in the instruction window do not access memory, then it may not be appropriate to choose a stress injection element that seeks to stress memory dependencies. Thus, in one example implementation, any stress injection element that is determined to be inappropriate for selection within a current iteration of the test modification process can have its default weight/bias cleared to 0, so as to prevent it being selected during that iteration.

Once the test modification process has been performed the desired number of times, then the test modification circuitry 25 can output the resultant modified program to generation circuitry 60 for inclusion within a supplemented test output by the generation circuitry 60. In addition to the instructions injected into various second paths by the stress injection elements, associated data may also be provided for reference when executing those injected instructions, such that the supplemented test will then include a modified version of the program used in the initial test, along with any associated additional data. When the supplemented test is run, the result information obtained from that supplemented test can be compared with the result information obtained when performing the initial test in order to determine whether there are any discrepancies, and such discrepancies will indicate the likelihood of a bug within the micro-architectural features of the design provided to support speculative execution. In one example implementation, the initial test whose result information 10 is used at the start of the above-described process is a test that resulted in architecturally compliant operation when that test was performed on the at least one representation of the processing device under test, as this can make detection of potential bugs occurring as a result of speculative execution more readily detectable from a comparison of the result information from the initial test with the result information from the supplemented test.

Whilst in one example implementation dedicated circuitry may be provided to implement the system of FIG. 1, in another example implementation the system can be implemented by running appropriate software on a general purpose computer. The initial test may be constructed in a variety of ways, and could for example be produced using a commercially available tool such as Raven (developed by Arm Limited, Cambridge, United Kingdom), which is a template-driven architectural verification test generator that consumes a description of test intent in order to generate test cases. Whilst mechanisms (such as the Boost framework also developed by Arm Limited, Cambridge, United Kingdom) are known for enabling verification engineers to modify test cases in order to seek to expand the coverage of a test case, most templates verify architectural functions and features, and since speculative execution should not affect architectural state typical default behaviour in such templates is to ignore the architecturally incorrect paths in such test cases (for instance by introducing no operations (NoPs) into such paths). That approach often misses critical errors that would be revealed during execution of more complex programs. However, trying to write meaningful stimulus and coverage for such architecturally incorrect paths (that might be followed during speculative execution) using existing tools has up until now been difficult, since it requires a verification engineer to manually discern each opportunity for speculative execution and analyse the opportunities for testing speculative behaviour. However, the technique described above provides a generic solution to these challenges by post-processing the result information from valid test cases (the initial test) in order to automatically inject instructions into the second paths (i.e. the architecturally incorrect paths to take) following control flow influencing events that are likely to be speculatively followed. This can significantly improve the efficiency and effectiveness of tests aimed at checking that micro-architectural features provided to support speculative execution do not affect architectural compliance of the design. In one particular example implementation, the technique described above can be incorporated within a supplemented version of the Boost framework.

Figure 2:
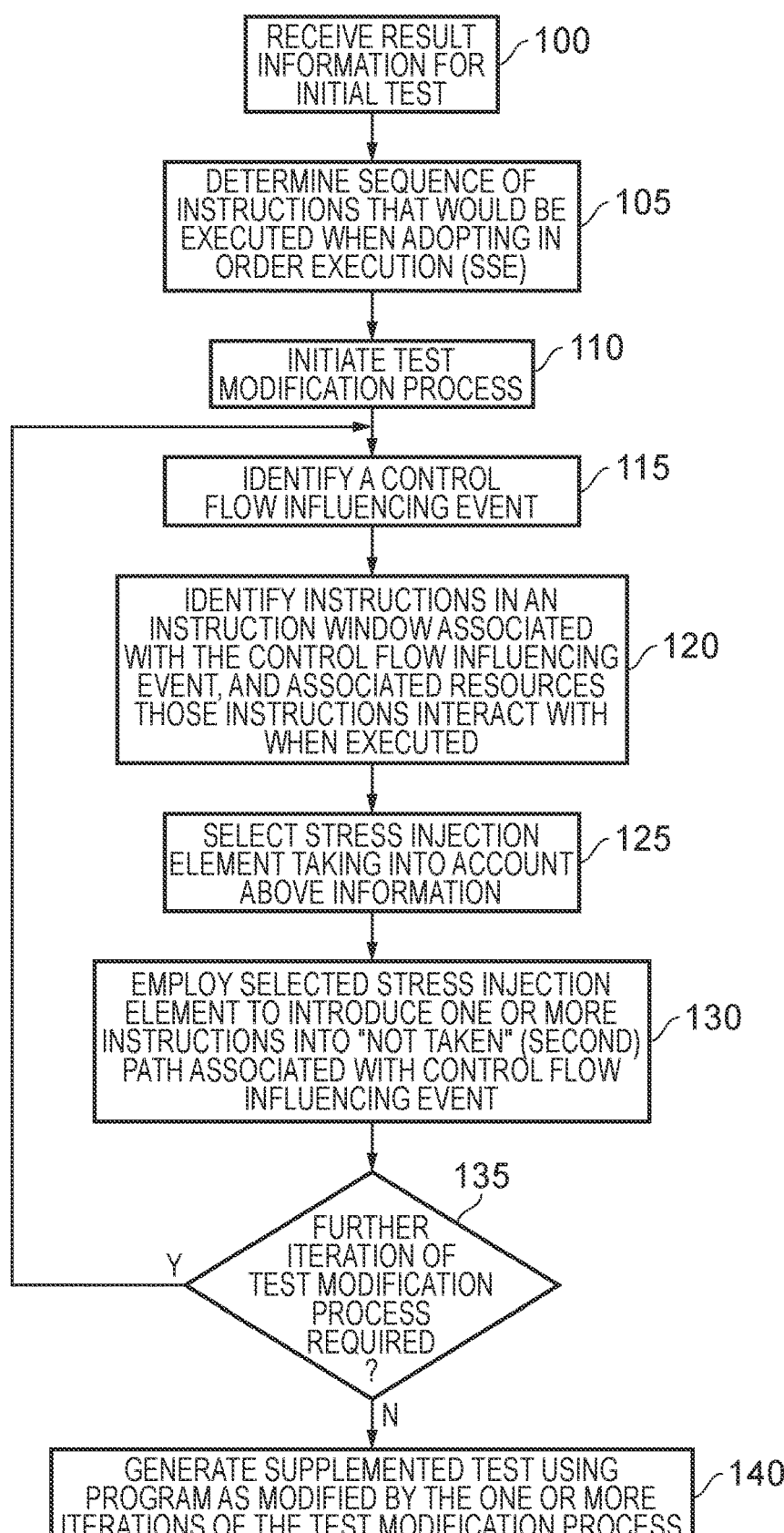
FIG. 2 is a flow diagram illustrating a process performed in one example arrangement in order to generate a supplemented test.

FIG. 2 is a flow diagram illustrating steps performed in accordance with the current technique in order to generate a supplemented test. At step 100, result information for the initial test is received, whereafter at step 105 the sequence of instructions that would be executed when adopting in order execution of the program specified for the initial test is determined. At step 110, the test modification process is initiated, whereafter at step 115 a control flow influencing event within the sequence determined at step 105 is identified.

Then, at step 120, the instructions within an instruction window associated with the control flow influencing event are identified, along with any associated resources that those instructions interact with when executed. As mentioned earlier, the process may also at this stage determine one or more items of architectural state relevant to the instruction window. Thereafter, at step 125, a stress injection element is selected taking into account the information determined at step 120, and then at step 130 the selected stress injection element is employed to introduce one or more instructions into the second path associated with the control flow influencing event, i.e. the path that would not be taken when adopting in order execution of the program but might be followed during speculative execution. In some instances, metadata may also be generated at this point associated with the instructions injected by the stress injection element, for example to identify any interactions between those instructions and other instructions in the program.

At step 135, it is determined whether any further iterations of the test modification process are required. This may for example be the case if there are other control flow influencing events within the sequence that should be considered, or if another stress injection element should be considered for the same control flow influencing event. In one example implementation, the test modification process is repeated at least once for each control flow influencing event detected within the instruction sequence determined at step 105. Once all desired iterations of the test modification process have been performed, the process proceeds to step 140 where a supplemented test is generated using the program as modified by the performed iterations of the test modification process.

Figure 3:
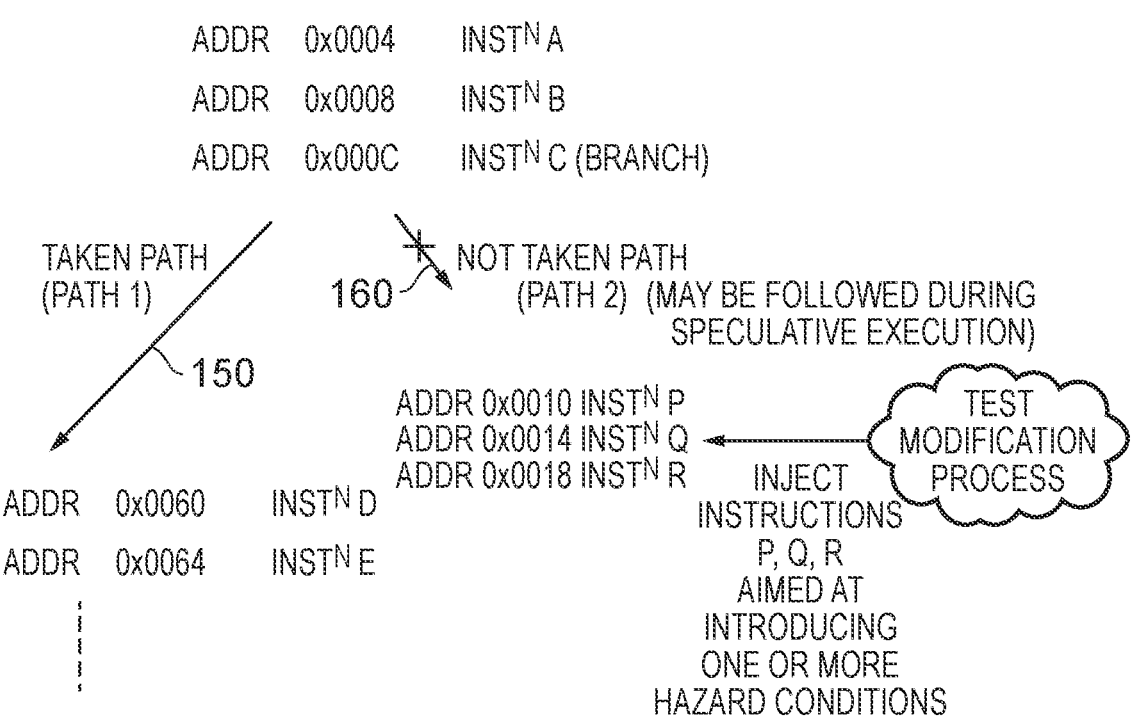
FIG. 3 schematically illustrates how the test modification process described herein may be used to inject instructions into a not taken path in order to generate a modified program.

FIG. 3 schematically illustrates how the test modification process described herein may be used to inject instructions into a not taken path in order to generate a modified program. In the illustrated example, it is assumed that instruction C is a branch instruction, and hence is an identified control flow influencing event. Further, when adopting simple sequential execution, it is determined that the path taken is that indicated by the arrow 150, i.e. path 150 is the architecturally correct path to take. Hence, following instruction C, simple sequential execution progresses to execution of instruction D. However, the architecturally incorrect path (referred to in FIG. 3 as the not taken path) 160 may be followed during speculative execution. As a result of the earlier described test modification process, it is assumed that instructions P, Q and R are to be injected into the path 160, aimed at inducing one or more hazard conditions as discussed earlier.

FIG. 4 schematically illustrates how the injected instructions generated by the test modification process may be added to unoccupied memory locations within the image of physical memory, in accordance with one example implementation. In particular, the result information for the initial test will include the image of physical memory 200. The shaded boxes 205 indicate occupied memory locations, i.e. locations used to store the instructions and data of the program provided for the initial test, whilst the empty boxes 210 indicate unoccupied memory locations. When generating the modified program, the additional instructions to be injected, and indeed any associated data, will be added to previously unoccupied memory locations within the image of physical memory 200. Hence, considering the example of FIG. 3, the injected instructions P, Q, R can be added within the unoccupied address space 215 shown in FIG. 4.

Figure 5:
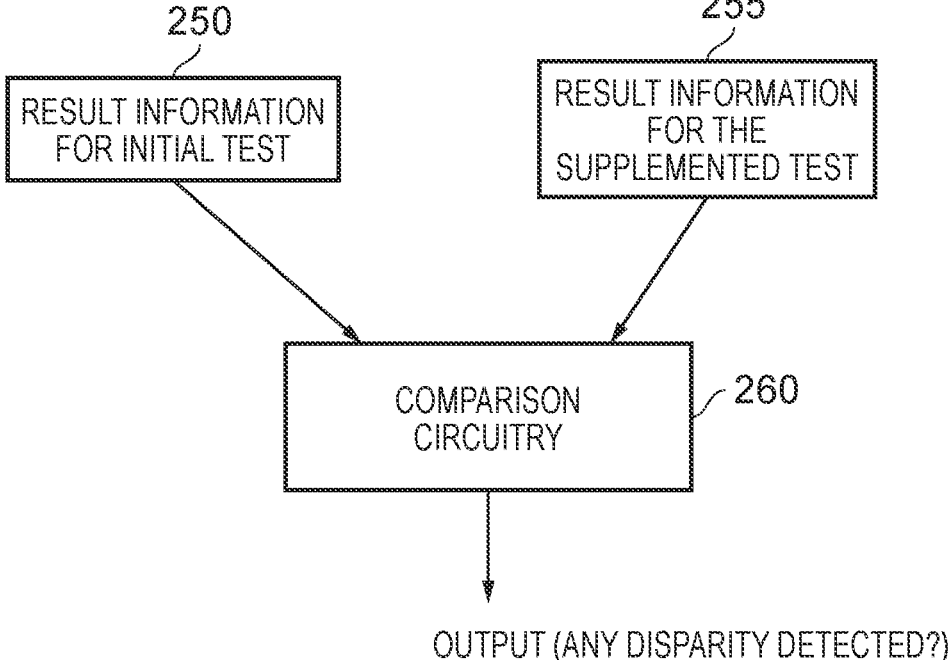
FIG. 5 is a diagram illustrating how result information generated for both an initial test, and for a supplemented test generated using the techniques described herein, may be compared in order to determine any disparities, in accordance with one example implementation.

FIG. 5 illustrates how result information generated for both the initial test and the supplemented test may be used in accordance with one example implementation. In particular, the result information 250 generated from performance of the initial test and the result information 255 generated from performance of the supplemented test may both be provided to comparison circuitry 260, which compares the two sets of result information in order to produce an output identifying any disparities. As discussed earlier, such disparities can be used to indicate the presence of one or more bugs within the micro-architectural features of the design provided to support speculative execution.

FIG. 6 is a flow diagram illustrating how a stress injection element may be selected at step 125 of FIG. 2, in accordance with one example implementation. At step 300, a determination is made, based on the identified instructions in the relevant instruction window, the associated resources, and optionally any captured items of architectural state, as to which stress injection elements are candidates for selection. The candidates for selection will be those stress injection elements whose associated hazard conditions could potentially be induced given the information evaluated at step 300.

At step 305, it is determined whether any candidate stress injection elements have been identified, and if not then at step 310 the test modification process is not performed for the currently considered control flow influencing event. However, assuming there is at least one candidate stress injection element identified, the process proceeds to step 315 where it is determined whether there is more than one candidate stress injection element identified. If not, then the single identified candidate is used as the selected stress injection element at step 320. However, in the presence of more than one candidate stress injection element, the process proceeds to step 325 where a selection algorithm is applied in order to select the stress injection element from amongst the candidate stress injection elements. As discussed earlier, a random selection may be performed here, optionally influenced by configuration information that may, for example, provide relative weight/biasing information for the various stress injection elements.

Figure 7:
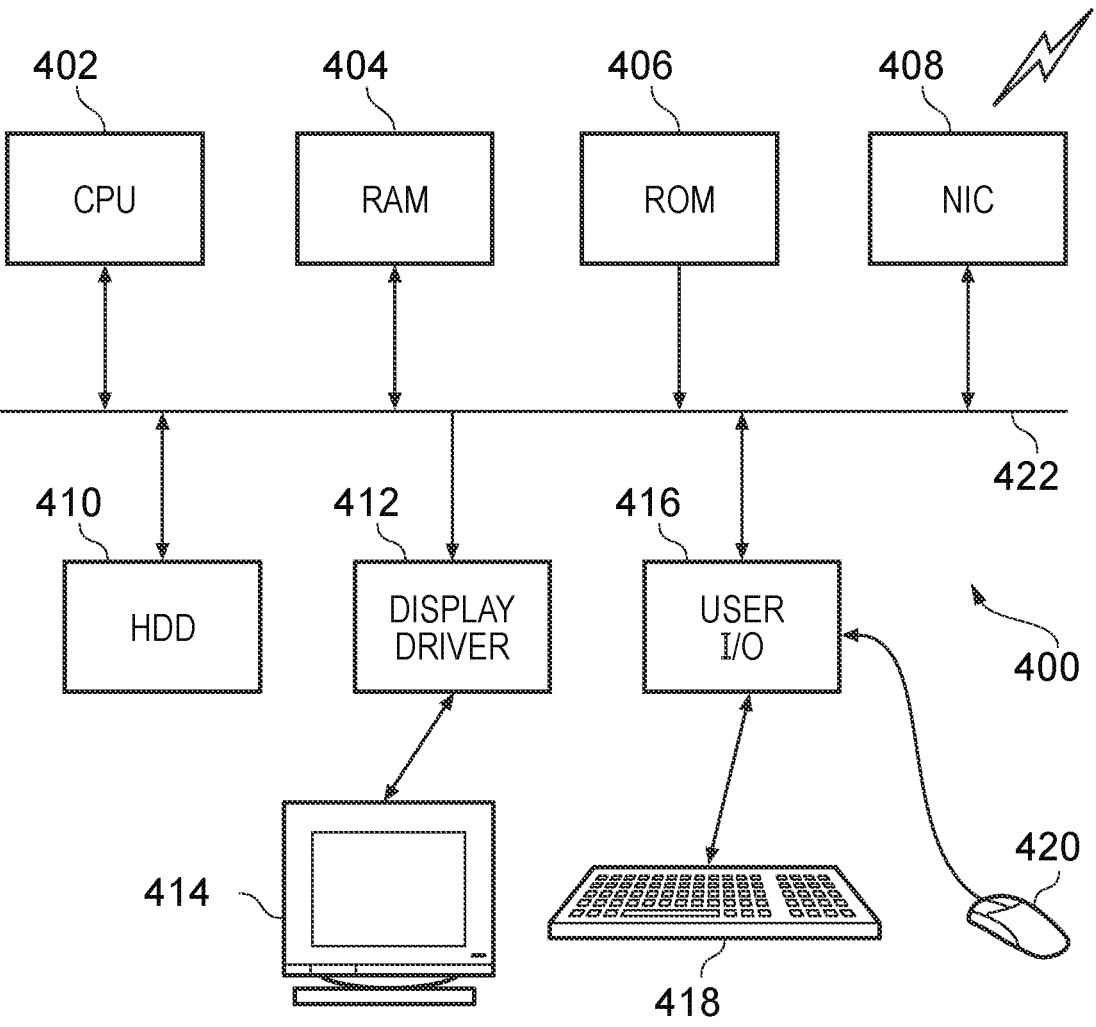
FIG. 7 illustrates a general purpose computer which may be used to implement the presently described techniques.

FIG. 7 schematically illustrates a general purpose computer 400 of the type that may be used to implement the above described techniques. The general purpose computer 400 includes a central processing unit 402, a random access memory 404, a read only memory 406, a network interface card 408, a hard disk drive 410, a display driver 412 and monitor 414 and a user input/output circuit 416 with a keyboard 418 and mouse 420 all connected via a common bus 422. It will be appreciated that other input/output circuitry 416 may be provided, such as a touchscreen (e.g., in implementations where the general purpose computer is a mobile device). In operation the central processing unit 402 will execute computer program instructions that may be stored in one or more of the random access memory 404, the read only memory 406 and the hard disk drive 410 or dynamically downloaded via the network interface card 408. The results of the processing performed may be displayed to a user via the display driver 412 and the monitor 414. User inputs for controlling the operation of the general purpose computer 400 may be received via the user input output circuit 416. It will be appreciated that the computer program could be written in a variety of different computer languages. The computer program may be stored and distributed on a recording medium or dynamically downloaded to the general purpose computer 400. When operating under control of an appropriate computer program, the general purpose computer 400 can perform the above described techniques and can be considered to form an apparatus for performing the above described techniques. The architecture of the general purpose computer 400 could vary considerably and FIG. 7 is only one example.

Alternatively, the above-described techniques may be implemented in a more distributed fashion, wherein the general purpose computer 400 illustrated in FIG. 7 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

Some example configurations are set out in the following numbered clauses:

1. A computer-implemented method of generating a supplemented test to be performed for a processing device under test, comprising:
   receiving result information generated as a result of performing an initial test on at least one representation of the processing device under test, the initial test providing a program to be executed and associated data to be used when performing the initial test;
   determining from the result information a sequence of instructions that would be executed by the processing device under test when adopting in order execution of the program;

providing a plurality of stress injection elements, each stress injection element having an associated hazard condition;
   employing test modification circuitry to perform one or more iterations of a test modification process comprising:
      identifying, from the sequence of instructions, a given control flow influencing event that causes a selection between a first path that will be chosen when adopting the in order execution of the program using the associated data provided by the initial test, and a second path;
      identifying from the result information one or more instructions in an instruction window associated with the given control flow influencing event, and one or more associated resources that the one or more instructions will interact with when executed;
      employing selection circuitry to select, in dependence on the one or more instructions and the one or more associated resources, a stress injection element from the plurality of stress injection elements;
      employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed; and
   generating the supplemented test using a modified program generated as a result of performing the one or more iterations of the test modification process.

2. A method as in Clause 1, wherein the initial test is a test that resulted in architecturally compliant operation when that test was performed on the at least one representation of the processing device under test.

3. A method as in Clause 2, wherein the method further comprises:
   receiving further result information generated as a result of performing the supplemented test on at least one representation of the processing device under test; and
   employing comparison circuitry to determine whether there is any disparity between the result information and the further result information.

4. A method as in any preceding clause, wherein the one or more iterations of the test modification process comprise multiple iterations of the test modification process, and for at least one iteration of the multiple iterations a control flow influencing event identified as the given control flow influencing event is different to the control flow influencing event identified as the given control flow influencing event for at least one other iteration of the multiple iterations.

5. A method as in any preceding clause, wherein the one or more iterations of the test modification process comprise multiple iterations of the test modification process, and for two or more iterations of the multiple iterations a same control flow influencing event is identified as the given control flow influencing event for those two or more iterations.

6. A method as in Clause 5, wherein for each of the two or more iterations a different stress injection element is selected.

7. A method as in any preceding clause, wherein the selection circuitry is arranged to determine at least one candidate stress injection element from the plurality of stress injection elements, and in the presence of more than one candidate stress injection element, to apply a selection algorithm to choose the selected stress injection element from the candidate stress injection elements.

8. A method as in Clause 7, wherein the selection circuitry is arranged to determine the at least one candidate stress injection element taking into account the one or more instructions in the instruction window, the one or more associated resources that the one or more instructions interact with when executed, and the associated hazard condition of each stress injection element in the plurality of stress injection elements.

9. A method as in Clause 7 or Clause 8, wherein the selection algorithm is arranged to reference configuration information used to apply relative weights to one or more of the stress injection elements that influence how the selected stress injection element is chosen.

10. A method as in any of clauses 7 to 9, wherein the selection algorithm is arranged to apply a pseudo random selection step when choosing the selected stress injection element from the candidate stress injection elements.

11. A method as in any preceding clause, wherein the sequence of instructions that would be executed by the processing device under test when adopting in order execution of the program is determined with reference to analysis of at least execution trace data for the program as provided by the result information.

12. A method as in any preceding clause, wherein the test modification process further comprises determining architectural state associated with the instruction window, and arranging the selection circuitry to reference the architectural state when selecting the stress injection element.

13. A method as in any preceding clause, wherein:
the result information comprises an image of physical memory identifying memory locations occupied by instructions forming the program to be executed and memory locations occupied by the associated data, and the selected stress injection element is arranged to insert the one or more additional instructions in unoccupied memory locations within the image of physical memory when modifying the program to include those one or more additional instructions.

14. A method as in any preceding clause, further comprising employing the selected stress injection element to add one or more items of additional data to the associated data, for use when executing the one or more additional instructions.

15. A method as in any preceding clause, wherein a size of the instruction window is configurable.

16. A method as in any preceding clause, wherein the given control flow influencing event comprises a control flow influencing instruction within the sequence of instructions.

17. A method as in any preceding clause, wherein when multiple iterations of the test modification process cause multiple stress injection elements to be selected for a same given control flow influencing event, each of the multiple stress injection elements causing one or more additional instructions to be added to the second path, the method further comprises generation of metadata identifying any interaction between the additional instructions added to the second path by different stress injection elements.

18. A method as in any preceding clause, wherein when the one or more additional instructions added by a given iteration of the test modification process include an added control flow influencing instruction, a further iteration of the test modification process is enabled to identify the added control flow influencing instruction as the given control flow influencing event for that further iteration.

19. A system comprising:
an input interface to receive result information generated as a result of performing an initial test on at least one representation of a processing device under test, the initial test providing a program to be executed and associated data to be used when performing the initial test;
sequence identifying circuitry to determine from the result information a sequence of instructions that would be executed by the processing device under test when adopting in order execution of the program;
a plurality of stress injection elements, each stress injection element having an associated hazard condition;
test modification circuitry to perform one or more iterations of a test modification process comprising:
identifying, from the sequence of instructions, a given control flow influencing event that causes a selection between a first path that will be chosen when adopting the in order execution of the program using the associated data provided by the initial test, and a second path;
identifying from the result information one or more instructions in an instruction window associated with the given control flow influencing event, and one or more associated resources that the one or more instructions will interact with when executed;
employing selection circuitry to select, in dependence on the one or more instructions and the one or more associated resources, a stress injection element from the plurality of stress injection elements; and
employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed; and
generation circuitry to generate a supplemented test using a modified program generated as a result of performing the one or more iterations of the test modification process.

20. A computer program comprising program instructions which, when executed on a computer, are arranged to cause the computer to implement the method of any of clauses 1 to 18.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A computer-implemented method of generating a supplemented test to be performed for a processing device under test, comprising:

receiving result information generated as a result of performing an initial test on at least one representation of the processing device under test, the initial test providing a program to be executed and associated data to be used when performing the initial test;

determining from the result information a sequence of instructions that would be executed by the processing device under test when adopting in order execution of the program;

providing a plurality of stress injection elements, each stress injection element having an associated hazard condition;

employing test modification circuitry to perform one or more iterations of a test modification process comprising:

identifying, from the sequence of instructions, a given control flow influencing event that causes a selection between a first path that will be chosen when adopting the in order execution of the program using the associated data provided by the initial test, and a second path;

identifying from the result information one or more instructions in an instruction window associated with the given control flow influencing event, and one or more associated resources that the one or more instructions will interact with when executed;

employing selection circuitry to select, in dependence on the one or more instructions and the one or more associated resources, a stress injection element from the plurality of stress injection elements;

employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed; and generating the supplemented test using a modified program generated as a result of performing the one or more iterations of the test modification process.

2. A method as claimed in claim 1, wherein the initial test is a test that resulted in architecturally compliant operation when that test was performed on the at least one representation of the processing device under test.

3. A method as claimed in claim 2, wherein the method further comprises:

receiving further result information generated as a result of performing the supplemented test on at least one representation of the processing device under test; and employing comparison circuitry to determine whether there is any disparity between the result information and the further result information.

4. A method as claimed in claim 1, wherein the one or more iterations of the test modification process comprise multiple iterations of the test modification process, and for at least one iteration of the multiple iterations a control flow influencing event identified as the given control flow influencing event is different to the control flow influencing event identified as the given control flow influencing event for at least one other iteration of the multiple iterations.

5. A method as claimed in claim 1, wherein the one or more iterations of the test modification process comprise multiple iterations of the test modification process, and for two or more iterations of the multiple iterations a same control flow influencing event is identified as the given control flow influencing event for those two or more iterations.

6. A method as claimed in claim 5, wherein for each of the two or more iterations a different stress injection element is selected.

7. A method as claimed in claim 1, wherein the selection circuitry is arranged to determine at least one candidate stress injection element from the plurality of stress injection elements, and in the presence of more than one candidate stress injection element, to apply a selection algorithm to choose the selected stress injection element from the candidate stress injection elements.

8. A method as claimed in claim 7, wherein the selection circuitry is arranged to determine the at least one candidate stress injection element taking into account the one or more instructions in the instruction window, the one or more associated resources that the one or more instructions interact with when executed, and the associated hazard condition of each stress injection element in the plurality of stress injection elements.

9. A method as claimed in claim 7, wherein the selection algorithm is arranged to reference configuration information used to apply relative weights to one or more of the stress injection elements that influence how the selected stress injection element is chosen.

10. A method as claimed in claim 7, wherein the selection algorithm is arranged to apply a pseudo random selection step when choosing the selected stress injection element from the candidate stress injection elements.

11. A method as claimed in claim 1, wherein the sequence of instructions that would be executed by the processing device under test when adopting in order execution of the program is determined with reference to analysis of at least execution trace data for the program as provided by the result information.

12. A method as claimed in claim 1, wherein the test modification process further comprises determining architectural state associated with the instruction window, and arranging the selection circuitry to reference the architectural state when selecting the stress injection element.

13. A method as claimed in claim 1, wherein:

the result information comprises an image of physical memory identifying memory locations occupied by instructions forming the program to be executed and memory locations occupied by the associated data, and the selected stress injection element is arranged to insert the one or more additional instructions in unoccupied memory locations within the image of physical memory when modifying the program to include those one or more additional instructions.

14. A method as claimed in claim 1, further comprising employing the selected stress injection element to add one or more items of additional data to the associated data, for use when executing the one or more additional instructions.

15. A method as claimed in claim 1, wherein a size of the instruction window is configurable.

16. A method as claimed in claim 1, wherein the given control flow influencing event comprises a control flow influencing instruction within the sequence of instructions.

17. A method as claimed in claim 1, wherein when multiple iterations of the test modification process cause multiple stress injection elements to be selected for a same given control flow influencing event, each of the multiple stress injection elements causing one or more additional instructions to be added to the second path, the method further comprises generation of metadata identifying any interaction between the additional instructions added to the second path by different stress injection elements.

18. A method as claimed in claim 1, wherein when the one or more additional instructions added by a given iteration of the test modification process include an added control flow influencing instruction, a further iteration of the test modification process is enabled to identify the added control flow influencing instruction as the given control flow influencing event for that further iteration.

19. A non-transitory computer-readable storage medium including a computer program comprising program instructions which, when executed on a computer, are arranged to cause the computer to implement the method of claim 1.

20. A system comprising:

an input interface to receive result information generated as a result of performing an initial test on at least one representation of a processing device under test, the initial test providing a program to be executed and associated data to be used when performing the initial test;

sequence identifying circuitry to determine from the result information a sequence of instructions that would be executed by the processing device under test when adopting in order execution of the program;

a plurality of stress injection elements, each stress injection element having an associated hazard condition;

test modification circuitry to perform one or more iterations of a test modification process comprising:

identifying, from the sequence of instructions, a given control flow influencing event that causes a selection between a first path that will be chosen when adopting the in order execution of the program using the associated data provided by the initial test, and a second path;

identifying from the result information one or more instructions in an instruction window associated with the given control flow influencing event, and one or more associated resources that the one or more instructions will interact with when executed;

employing selection circuitry to select, in dependence on the one or more instructions and the one or more associated resources, a stress injection element from the plurality of stress injection elements; and employing the selected stress injection element to modify the program by introducing into the second path one or more additional instructions that, when executed, will provide a stimulus aimed at inducing the associated hazard condition during operation of the processing device under test when speculative execution of instructions to support out of order execution causes the instructions in the second path to be speculatively executed; and generation circuitry to generate a supplemented test using a modified program generated as a result of performing the one or more iterations of the test modification process.

* * * * *